United States Patent
Suzuki et al.

(10) Patent No.: US 9,500,273 B2
(45) Date of Patent: Nov. 22, 2016

(54) IN-WHEEL MOTOR DRIVE DEVICE HAVING LUBRICATION SYSTEMS WITH COOLING FINS

(75) Inventors: Minoru Suzuki, Iwata (JP); Ken Yamamoto, Iwata (JP); Tetsuya Yamamoto, Iwata (JP)

(73) Assignee: NTN CORPORATION, Osaka (JP)

( * ) Notice: Subject to any disclaimer, the term of this patent is extended or adjusted under 35 U.S.C. 154(b) by 544 days.

(21) Appl. No.: 13/697,828

(22) PCT Filed: May 11, 2011

(86) PCT No.: PCT/JP2011/060868
§ 371 (c)(1),
(2), (4) Date: Nov. 14, 2012

(87) PCT Pub. No.: WO2011/145502
PCT Pub. Date: Nov. 24, 2011

(65) Prior Publication Data
US 2013/0057117 A1    Mar. 7, 2013

(30) Foreign Application Priority Data

May 17, 2010  (JP) ................................ 2010-113096

(51) Int. Cl.
*F16H 57/04*  (2010.01)
*B60K 7/00*  (2006.01)
(Continued)

(52) U.S. Cl.
CPC ......... *F16H 57/0412* (2013.01); *B60K 7/0007* (2013.01); *H02K 7/116* (2013.01); *B60K 17/046* (2013.01); *B60K 2007/0038* (2013.01);
(Continued)

(58) Field of Classification Search
CPC .......... H02K 7/00; H02K 7/006; H02K 7/10; H02K 9/19
USPC ........................................ 310/67 R, 54, 60 R
See application file for complete search history.

(56) References Cited

U.S. PATENT DOCUMENTS 5,014,800 A * 5/1991 Kawamoto .......... B60K 7/0007
                                                        180/65.51
5,111,089 A * 5/1992 Wakuta et al. ................. 310/54
(Continued)

FOREIGN PATENT DOCUMENTS

EP       1 956 272      8/2008
JP       2005-237176    9/2005
(Continued)

OTHER PUBLICATIONS

Ito et al., In Wheel Motor Driving Device (English Translation), Mar. 26, 2009, JPO.*

(Continued)

*Primary Examiner* — Terrance Kenerly
*Assistant Examiner* — Rashad Johnson
(74) *Attorney, Agent, or Firm* — Clark & Brody

(57) ABSTRACT

A plurality of circumferential fins 22g are formed on an outer peripheral surface of a motor casing 22a, and a plurality of fins 22f are formed on an outer surface of a motor rear cover 22d. Lubricant circulates in a motor-casing oil passage 55 provided in the motor casing 22a, a motor-rear-cover oil passage 56 provided in the motor rear cover 22d, and a speed reduction portion B. This lubricant is cooled when flowing in the motor-casing oil passage 55 and the motor-rear-cover oil passage 56. Thus, an in-wheel motor drive device 21 is efficiently cooled.

8 Claims, 5 Drawing Sheets

(51) Int. Cl.
*H02K 7/116* (2006.01)
*B60K 17/04* (2006.01)
*F16H 1/32* (2006.01)
*H02K 7/14* (2006.01)
*H02K 9/19* (2006.01)

(52) U.S. Cl.
CPC .... *B60K2007/0092* (2013.01); *B60L 2220/44* (2013.01); *B60L 2240/425* (2013.01); *B60Y 2306/03* (2013.01); *F16H 1/32* (2013.01); *F16H 57/0476* (2013.01); *F16H 2001/325* (2013.01); *H02K 7/14* (2013.01); *H02K 9/19* (2013.01); *Y02T 10/641* (2013.01); *Y02T 10/642* (2013.01)

(56) References Cited

U.S. PATENT DOCUMENTS

| | | | |
|---|---|---|---|
| 5,111,090 A * | 5/1992 | Otake et al. | 310/54 |
| 5,127,485 A * | 7/1992 | Wakuta et al. | 180/65.51 |
| 5,372,213 A * | 12/1994 | Hasebe | B60K 1/02 180/65.6 |
| 5,396,968 A * | 3/1995 | Hasebe | B60K 1/02 180/233 |
| 6,081,056 A * | 6/2000 | Takagi et al. | 310/89 |
| 6,098,479 A * | 8/2000 | Hoermansdoerfer | B60T 13/741 475/333 |
| 6,100,615 A * | 8/2000 | Birkestrand | B62K 23/04 180/65.51 |
| 6,329,731 B1 * | 12/2001 | Arbanas et al. | 310/52 |
| 6,355,996 B1 * | 3/2002 | Birkestrand | B62K 23/04 180/65.51 |
| 7,095,146 B2 * | 8/2006 | Fukazawa et al. | 310/89 |
| 8,602,145 B2 * | 12/2013 | Su | B60K 7/0007 180/65.51 |
| 2004/0145253 A1 * | 7/2004 | Browne et al. | 310/58 |
| 2009/0038865 A1 * | 2/2009 | Moriguchi | B60K 7/0007 180/55 |
| 2012/0181848 A1 * | 7/2012 | Makino et al. | 301/6.5 |
| 2015/0224868 A1 * | 8/2015 | Makino | B60L 15/20 301/6.5 |

FOREIGN PATENT DOCUMENTS

| | | | |
|---|---|---|---|
| JP | 2006-050765 | | 2/2006 |
| JP | 2006050765 A | * | 2/2006 |
| JP | 2006-240429 | | 9/2006 |
| JP | 2006240429 A | * | 9/2006 |
| JP | 2006-282158 | | 10/2006 |
| JP | 2006282158 A | * | 10/2006 |
| JP | 2008-184141 | | 8/2008 |
| JP | 2009-063043 | | 3/2009 |
| JP | 2010-038357 | | 2/2010 |
| WO | 2010/001698 | | 1/2010 |

OTHER PUBLICATIONS

Meriam Webster Dictionary, Definition of "Ridge", Obtained Mar. 2, 2015, 'http://www.merriam-webster.com/dictionary/ridge'.*
Mizutani et al., English Translation of JP 2006-240429.*
Niiguni et al., English Translation of JP 2006-050765.*
Kamiya et al., ENglish Translation of JP 2006-282158.*

* cited by examiner

US 9,500,273 B2

IN-WHEEL MOTOR DRIVE DEVICE HAVING LUBRICATION SYSTEMS WITH COOLING FINS

TECHNICAL FIELD

The present invention relates to a cooling structure of an in-wheel motor drive device for use as a power source of a vehicle.

BACKGROUND ART

For example, a technique described in Japanese Unexamined Patent Application Publication No. 2009-63043 (Patent Literature 1) is conventionally known as a technique relating to in-wheel motor drive devices. In an in-wheel motor drive device described in Patent Literature 1, a rotary pump is provided in a casing of the in-wheel motor drive device, and lubricant is forcibly circulated by the rotary pump to stably lubricate the entire region of a speed reduction portion. Moreover, a cooling water passage is provided in the casing to cool the in-wheel motor drive device.

CITATION LIST

Patent Literature

PTL 1: Japanese Unexamined Patent Application Publication No. 2009-63043

SUMMARY OF INVENTION

Technical Problem

Lubricant is effective in removing heat generated in a motor and a rotating body portion and dissipating the heat to the outside of the in-wheel motor drive device while circulating in a path in the in-wheel motor drive device. Moreover, forcibly supplying the lubricant to each part of the speed reduction portion can maintain a stably lubricated state, which is effective in stabilizing the functions of the speed reduction portion and improving durability. Since such a conventional in-wheel motor drive device is provided with a lubricant circulation passage and a cooling water passage, the structure of the in-wheel motor drive device is complicated, and there is room for improvement in terms of the cost. However, the lubricant may not be sufficiently cooled in the case where no cooling water passage is provided and only the lubricant is circulated inside the in-wheel motor drive device, in the case where the motor continuously generates high torque and high output and thus generates a large amount of heat, or in the case where the vehicle is used under high temperature conditions.

In view of the above problems, it is an object of the present invention to provide a technique capable of improving capability to cool lubricant inside an in-wheel motor drive device by a simple configuration without providing a cooling water passage.

Solution to Problem

In order to achieve the above object, an in-wheel motor drive device according to the present invention includes: a motor portion having a cylindrical motor casing, a motor rear cover that covers an opening located on one side in an axial direction of the motor casing, a plurality of cooling fins that are formed on at least one of an outer peripheral surface of the motor casing and an outer surface of the motor rear cover, and a motor rotation shaft that is provided in the motor casing to output rotation to the other side in the axial direction of the motor casing; a speed reduction portion which has a cylindrical speed-reduction-portion casing having its one side in the axial direction connected to the other side in the axial direction of the motor casing, an input shaft provided in the speed-reduction-portion casing and coupled to the motor rotation shaft, and an output shaft, and which reduces a speed of rotation of the input shaft to transmit the rotation having the reduced speed to the output shaft; a wheel hub that is rotatably supported in an opening located on the other side of the speed-reduction-portion casing, and is fixed and coupled to the output shaft; and a lubricant circulation passage which has an oil passage provided in the motor casing having the cooling fins formed thereon or in the motor rear cover having the cooling fins formed thereon, and which allows lubricant to circulate in the oil passage and the speed reduction portion to lubricate inside of the speed reduction portion.

According to the present invention, the plurality of cooling fins are formed on the surface of at least one of the motor rear cover and the motor casing. This increases the surface area of at least one of the motor rear cover and the motor casing, and thus enhances the heat dissipation effect, and the lubricant flowing in the oil passage provided in the motor casing or the motor rear cover is effectively cooled. Accordingly, the lubricant flowing in the speed reduction portion can effectively cool the inside of the speed reduction portion. The "plurality of cooling fins" of the present invention refers to a heat dissipation member, and may have any concavo-convex shape that increases the surface area. Accordingly, the plurality of cooling fins may be implemented by providing a multiplicity of protrusions, may be implemented as corrugated fins formed by a plurality of ridges arranged at regular intervals, or may be implemented as intermittent ridges.

The oil passage of the present invention is provided in an outer shell member (the motor rear cover or the motor casing) of the motor portion on which the cooling fins are formed, and the direction in which the oil passage extends and the position of the oil passage are not particularly limited. However, as a preferred embodiment, the oil passage includes a motor-casing oil passage provided in the motor casing, and the cooling fins are formed in a region of the outer peripheral surface of the motor casing where the motor-casing oil passage is provided. According to this embodiment, the cooling fins are formed near the motor-casing oil passage, whereby the lubricant can be effectively cooled.

The position of the motor-casing oil passage in the motor casing is not particularly limited. For example, the motor-casing oil passage may be provided inside the motor casing, and the cooling fins may protrude from the outer peripheral surface of the motor casing. As another preferred embodiment, a motor-casing ridge is formed on the outer peripheral surface of the motor casing, the motor-casing oil passage is provided inside the motor-casing ridge, and the cooling fins extend from the motor-casing ridge. According to this embodiment, heat of the motor-casing oil passage is dissipated via the motor-casing ridge and the cooling fins, whereby the lubricant flowing in the motor-casing oil passage can be more efficiently cooled. The cooling fins may extend perpendicularly to the motor-casing ridge or may obliquely cross the motor-casing ridge.

As one embodiment, the motor-casing ridge extends in the axial direction of the motor casing, and the cooling fins extend in a circumferential direction of the motor casing. According to this embodiment, the multiplicity of cooling fins extend in the circumferential direction so as to extend perpendicularly to the motor-casing oil passage extending in the axial direction. Thus, the lubricant flowing in the motor-casing oil passage can be more efficiently cooled.

As another embodiment, the oil passage includes a motor-rear-cover oil passage provided in the motor rear cover, and the cooling fins are formed in a region of the outer surface of the motor rear cover where the motor-rear-cover oil passage is provided. According to this embodiment, the cooling fins are formed near the motor-rear-cover oil passage. Thus, the lubricant can be effectively cooled.

The cooling fins that are formed on the outer surface of the motor rear cover are not limited to one embodiment, and may have various shapes. The position of the motor-rear-cover oil passage in the motor rear cover is not particularly limited. For example, the motor-rear-cover oil passage may be provided inside the motor rear cover, and the cooling fins may protrude from the outer surface of the motor rear cover. As another preferred embodiment, a motor-rear-cover ridge is formed on the outer surface of the motor rear cover, the motor-rear-cover oil passage is provided inside the motor-rear-cover ridge, and the cooling fins extend from the motor-rear-cover ridge. According to this embodiment, heat of the motor-rear-cover oil passage is dissipated via the motor-rear-cover ridge and the cooling fins, whereby the lubricant flowing in the motor-rear-cover oil passage can be more efficiently cooled. The cooling fins may extend perpendicularly to the motor-rear-cover ridge or may obliquely cross the motor-rear-cover ridge.

As one embodiment, the motor-rear-cover oil passage extends in a vertical direction, and the cooling fins extend in a horizontal direction. According to this embodiment, the multiplicity of cooling fins extend perpendicularly to the motor-rear-cover oil passage extending in the top-bottom or vertical direction, and thus extend parallel to the road surface. Accordingly, the lubricant flowing in the motor-rear-cover oil passage can be more efficiently cooled.

Preferably, the cooling fins are comprised of a same material as the motor casing having the cooling fins provided thereon or the motor rear cover having the cooling fins provided thereon. According to this embodiment, the cooling fins can be formed integrally with the base material on which the cooling fans are provided. More preferably, the cooling fins are formed by casting. As another embodiment, in the case where the cooling fins are comprised of the same material as the motor casing or the motor rear cover, the cooling fins may be first formed as a separate element from the motor casing or the motor rear cover, and then attached to the motor casing or the motor rear cover. The cooling fins may be comprised of a different material from the motor casing or the motor rear cover, and may be attached to the motor casing or the motor rear cover.

The lubricant circulation passage of the present invention may have a lubricant pump that discharges the lubricant, and the lubricant pump may be provided outside of the in-wheel motor drive device. Alternatively, the lubricant circulation passage of the present invention may have a lubricant pump that discharges the lubricant, and the lubricant pump may be provided inside the motor casing or inside the speed-reduction-portion casing. According to this embodiment, a compact lubricant circulation passage can be implemented.

As a preferred embodiment, the speed reduction portion is a cycloidal speed reducer having an eccentric member provided on the input shaft, a revolution member provided on the eccentric member, an outer-periphery engagement member that engages with an outer periphery of the revolution member to cause rotation motion of the revolution member, and a motion conversion mechanism that outputs and transmits the rotation motion of the revolution member to the output shaft. According to this embodiment, the speed reduction portion can be reduced in size, and the degree of speed reduction can be increased as compared to a combination of spur gears.

Advantageous Effects of Invention

As described above, according to the present invention, the plurality of cooling fins are formed on the outer surface of the motor rear cover, and the oil passage, through which the lubricant lubricating the speed reduction portion flows, is provided in the motor rear cover on which the cooling fins are formed. Accordingly, the lubricant flowing in the oil passage can be effectively cooled by the cooling fins. Moreover, the plurality of cooling fins are formed on the outer peripheral surface of the motor casing, and the oil passage, through which the lubricant lubricating the inside of the speed reduction portion flows, is provided in the motor casing on which the cooling fins are formed. Thus, the lubricant flowing in the oil passage can be effectively cooled by the cooling fins. Accordingly, with the simple configuration, the speed reduction portion can be lubricated, and the lubricant can be sufficiently cooled in the case where a motor continuously generates high torque and high output and thus generates a large amount of heat, or in the case where a vehicle is used under high temperature conditions.

DESCRIPTION OF EMBODIMENTS

An embodiment of the present invention will be described in detail below with reference to the accompanying drawings.

Figure 1:
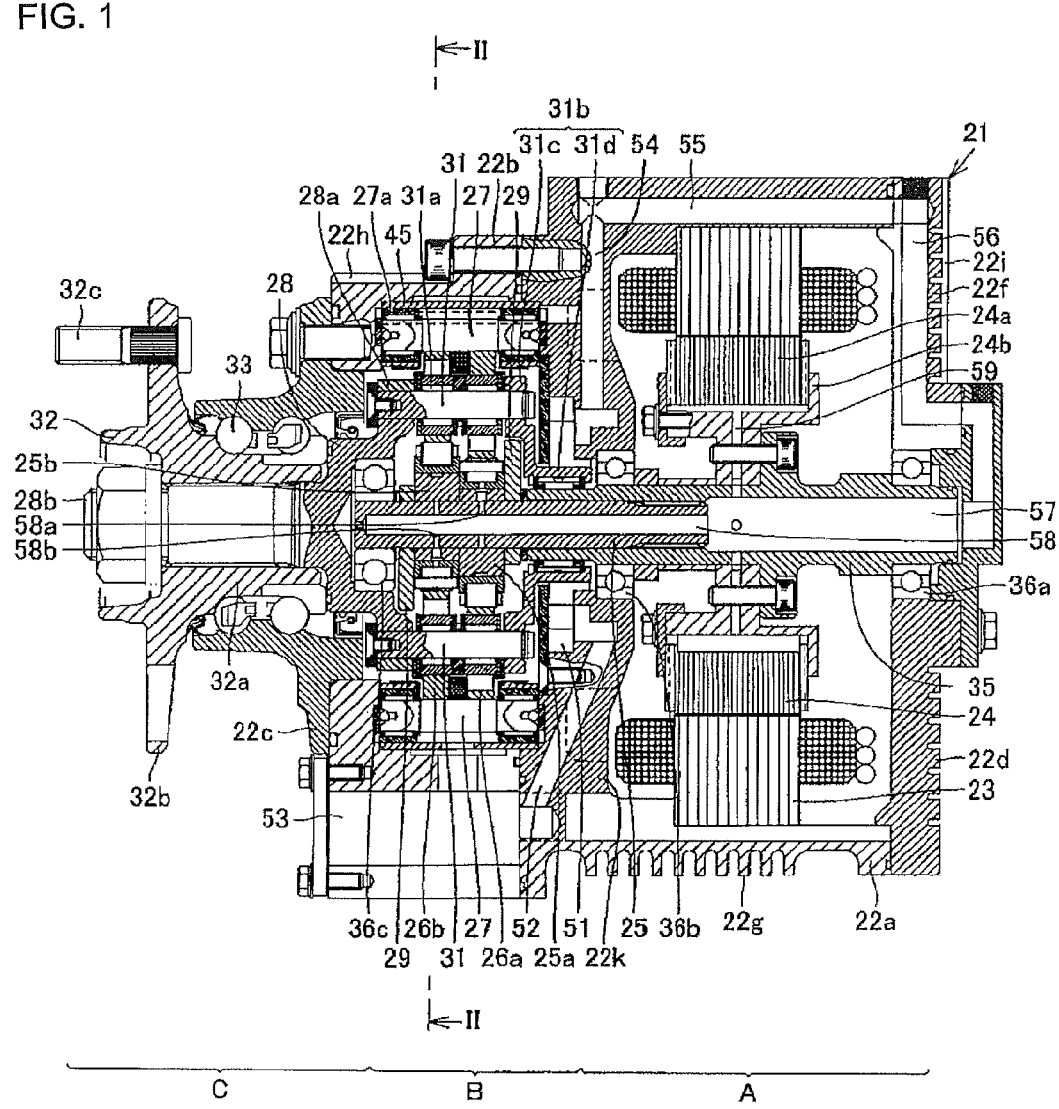
FIG. 1 is a longitudinal sectional view showing an in-wheel motor drive device according to an embodiment of the present invention.
Figure 2:
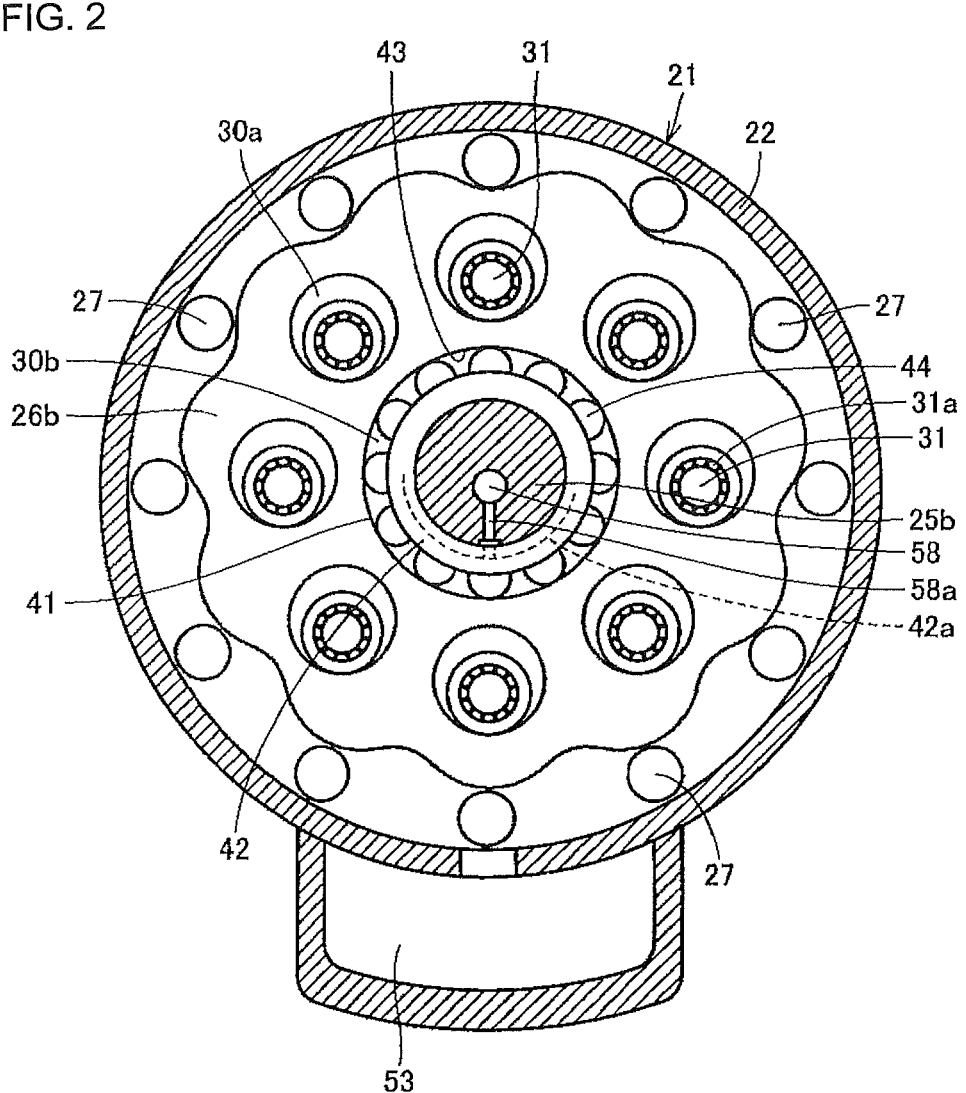
FIG. 2 is a sectional view taken along line II-II in FIG. 1.
Figure 3:
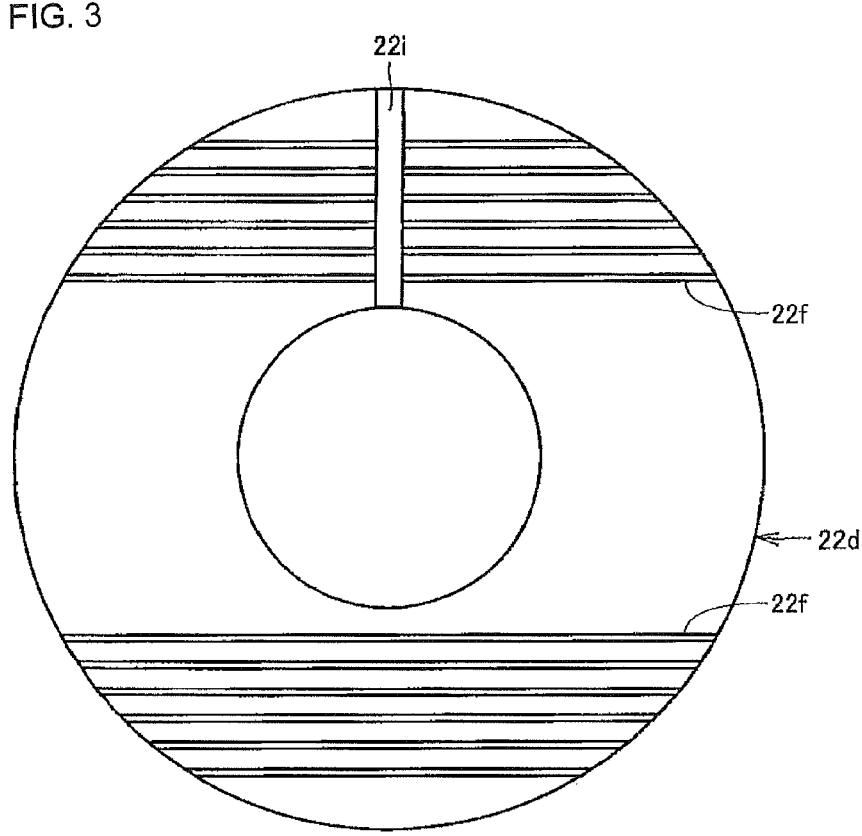
FIG. 3 is a rear view of the in-wheel motor drive device in FIG. 1.

FIG. 1 is a longitudinal sectional view showing an in-wheel motor drive device according to an embodiment of the present invention. FIG. 2 is a schematic sectional view taken along line II-II in FIG. 1, and fins etc. are not shown in FIG. 2. FIG. 3 is a rear view of the in-wheel motor drive device in FIG. 1. FIG. 3 shows the outer surface of a motor rear cover, and the shape of a central portion is not shown in the figure.

An in-wheel motor drive device 21 as a power source of an electric car is attached inside a wheel housing, and is formed by a motor portion A that generates a driving force, a speed reduction portion B that reduces the speed of rotation of the motor portion A to output the rotation having the reduced speed, and a wheel-hub bearing portion C that transmits the output of the speed reduction portion B to a driving wheel, not shown. The motor portion A, the speed reduction portion B, and the wheel-hub bearing portion C are sequentially arranged coaxially in the axial direction in this order.

A motor casing 22a is a part having a cylindrical shape and forming an outer shell of the motor portion A. An opening on one side in the axial direction of the motor casing 22a is covered and sealed by a motor rear cover 22d. The motor rear cover 22d has a disc shape, and a central portion of the inner surface of motor rear cover 22d rotatably supports one end of a motor rotation shaft 35 via a bearing 36a. A plurality of fins 22f are formed in the outer surface of the motor rear cover 22d. The fins 22f are integrally connected to the motor rear cover 22d.

In the present embodiment, the fins 22f as cooling fins protruding outward from the motor rear cover 22d extend substantially in the horizontal direction (parallel to the road surface) as shown in FIG. 3. The plurality of fins 22f are provided at regular intervals. A motor-rear-cover oil passage 56 is provided inside the motor rear cover 22d so that lubricant flows therein. The motor-rear-cover oil passage 56 extends in the radial direction from the outer edge of the motor rear cover 22d to a central portion thereof. The motor-rear-cover oil passage 56 extends substantially in the top-bottom direction (the vertical direction).

A plurality of circumferential fins 22g are formed in the outer peripheral surface of the cylindrical motor casing 22a. The circumferential fins 22g are integrally connected to the motor casing 22a. The circumferential fins 22g as cooling fins protruding outward from the motor casing 22a are a multiplicity of ridges extending in the circumferential direction. The circumferential fins 22g are a multiplicity of ridges formed at intervals in the axial direction of the motor rotation shaft 35. The circumferential fins 22g are provided to extend in the lower portion of the motor casing 22a and both side portions located between the lower and upper portions of the motor casing 22a, and connect to a motor-casing ridge 22j provided in the upper portion of the motor casing 22a. The motor-casing ridge 22j will be described later. A motor-casing oil passage 55 is provided in the upper portion of the motor casing 22a so that the lubricant flows therein. No passage in which liquid other than the lubricant flows is provided in the motor casing 22a.

While an electric car including the in-wheel motor drive device is traveling, the motor housing 22a and the motor rear cover 22d are exposed to outside air. Accordingly, the fins 22f and the circumferential fins 22g enhance the heat dissipation effect of the motor casing 22a and the motor rear cover 22d. In particular, outside air strongly impinges on the motor rear cover 22d of the motor portion A, which is exposed from a road wheel, and thus the fins 22f have a high heat dissipation effect.

The motor portion A is a radial gap motor including a stator 23 fixed to the inner peripheral surface of the motor casing 22a, a rotor 24 positioned radially inward of the stator 23 so as to face the stator 23 with a radial gap therebetween, and the motor rotation shaft 35 fixed and coupled to the inner side of the rotor 24 so as to rotate together with the rotor 24. The rotor 24 has a hollow cylindrical rotor main body 24a formed by stacking a plurality of discs each having a through hole in its center, and a cylindrical rotor support body 24b fixed to the inner periphery of the rotor main body 24a and the outer periphery of the motor rotation shaft 35 and supporting the rotor main body 24a in a central portion in the axial direction of the motor rotation shaft 35. The one end of the motor rotation shaft 35 is rotatably supported by the motor rear cover 22d via the rolling bearing 36a. One of both ends of the motor rotation shaft 35, which is located closer to the speed reduction portion B, is coupled to an input shaft 25 of the speed reduction portion B.

A speed-reduction-portion casing 22b of the speed reduction portion B has a cylindrical shape with a smaller diameter than the motor casing 22a, and forms an outer shell of the speed reduction portion B. One side in the axial direction of the speed-reduction-portion casing 22b is connected to the other side in the axial direction of the motor casing 22a. A partition wall 22k is provided between the motor casing 22a and the speed-reduction-portion casing 22b. The partition wall 22k has a disc shape, and has a central hole through which the motor rotation shaft 35 extends. A rolling bearing 36b is provided between the inner periphery of the central hole and the outer periphery of the motor rotation shaft 35. The other end of the motor rotation shaft 35 is rotatably supported by the partition wall 22k via the rolling bearing 36b. A plurality of outer peripheral fins 22h are formed in the outer peripheral surface of the speed-reduction-portion casing 22b. The fins 22h are integrally connected to the speed-reduction-portion casing 22b. The outer peripheral fins 22h as cooling fins protruding outward from the speed-reduction-portion casing 22b are a multiplicity of ridges extending in the axial direction. The outer peripheral fins 22h enhance the heat dissipation effect of the speed reduction portion B.

The speed reduction portion B has: the input shaft 25 provided inside the speed-reduction-portion casing 22b; eccentric members 25a, 25b eccentrically provided on an end of the input shaft 25 which is located farther from the motor rotation shaft 35; curve plates 26a, 26b as revolution members whose inner peripheries are relatively rotatably attached to the outer peripheries of the eccentric members 25a, 25a and which make revolution motion about a rotation axis according to rotation of the input shaft 25; a plurality of outer pins 27 as outer-periphery engagement members that engage with the outer peripheries of the curve plates 26a, 26b to cause rotation motion of the curve plates 26a, 26b; a motion conversion mechanism that outputs and transmits only the rotation motion of the curve plates 26a, 26b to an output shaft 28; the output shaft 28 that transmits rotation resulting from reducing the speed of the rotation motion in the speed reduction portion B to the wheel-hub bearing portion C; and counterweights 29 attached to the input shaft 25 at positions adjoining the eccentric members 25a, 25b, respectively. The lubricant is supplied to the speed reduction portion B by a lubricant circulation passage described below.

One of both ends of the input shaft 25, which is located on the side of the wheel-hub bearing portion C, is supported in the speed reduction portion B by a rolling bearing 36c. One of both ends of the input shaft 25, which is located on the side of the motor portion A, fits in the other end of the motor rotation shaft 35. The eccentric members 25a, 25b attached to the end of the input shaft 25 are disc-shaped eccentric members attached so as to be eccentric with respect to the axis. Moreover, the two eccentric members 25a, 25b are provided with a phase difference of 180° therebetween so that respective centrifugal forces produced by their eccentric motion cancel out each other.

The output shaft 28 placed coaxially with the motor rotation shaft 35 and the input shaft 25 extends from the speed reduction portion B to the wheel-hub bearing portion C, and has a shaft portion 28b located on the side of the wheel-hub bearing portion C, and a flange portion 28a formed at an end of the shaft portion 28b and located on the side of the speed reduction portion B. The flange portion 28a located inside the speed reduction portion B is placed so as to face a tip end of the input shaft 25 which is located on the side where the input shaft 25 is coupled to the eccentric members 25a, 25b. A central hole in the flange portion 28a receives the tip end of the input shaft 25, and relatively rotatably supports the tip end of the input shaft 25 via the rolling bearing 36c. Holes that fix inner pins 31 are formed in the end face of the flange portion 28a at regular intervals along a circumference about the rotation axis of the output shaft 28. These holes extend parallel to the axis of the output shaft 28. The shaft portion 28b has a hollow structure, and a wheel hub 32 of the wheel-hub bearing portion C is fitted on the outer peripheral surface of the shaft portion 28b.

Referring to FIG. 2, the curve plate 26b has, along its outer periphery, a plurality of waves formed by a trochoid curve such as an epitrochoid, and has a plurality of through holes 30a, 30b extending through the curve plate 26b from its one end face to the other end face. The plurality of through holes 30a are provided at regular intervals along a circumference about the axis of the rotation motion of the curve plate 26a to receive the inner pins 31 described below. The through hole 30b is provided in the center (the axis of the rotation motion) of the curve plate 26a, and holds the eccentric member 25b so that the outer peripheral surface of the eccentric member 25b forms a circle concentric with the through hole 30b.

That is, the curve plate 26b is supported by a rolling bearing 41 so as to be rotatable with respect to the eccentric member 25b. The rolling bearing 41 is a cylindrical roller bearing including: an inner-race member 42 that fits on the outer peripheral surface of the eccentric member 25b and that has an inner raceway 42a on its outer peripheral surface; an outer raceway 43 directly formed on the inner peripheral surface of the through hole 30b in the curve plate 26b; a plurality of cylindrical rollers 44 that are placed between the inner raceway 42a and the outer raceway 43; and a retainer (not shown) that retains the intervals between adjoining one of the cylindrical rollers 44. Alternatively, the rolling bearing 41 may be a deep groove ball bearing. The inner-race member 42 further has a pair of flange portions facing each other so that the inner raceway 42a of the inner-race member 42 on which the cylindrical rollers 44 roll is interposed between the flange portions in the axial direction. The inner-race member 42 holds the cylindrical rollers 44 between the pair of flange portions.

The outer pins 27 are supported by the speed-reduction-portion casing 22b, and are provided at regular intervals along a circumferential track about the rotation axis of the input shaft 25. The outer pins 27 extend parallel to the axis, and both ends of the outer pins 27 are held by an outer-pin holding portion 45 that is fitted on and fixed to the inner peripheral surface of the speed-reduction-portion casing 22b. More specifically, both axial ends of the outer pins 27 are rotatably supported by a needle roller bearing 27a attached to the outer-pin holding portion 45.

When the curve plates 26a, 26b make revolution motion about the rotation axis of the input shaft 25, the curved waves engage with the outer pins 27, causing rotation motion of the curve plates 26a, 26b. The needle roller bearing 27a provided at both ends of the outer pins 27 reduces frictional resistance with the curve plates 26a, 26b when the outer pins 27 contact the outer peripheral surfaces of the curve plates 26a, 26b.

Each counterweight 29 has a circular plate shape, and has a through hole at a position offset from the center of the circular plate, so that the input shaft 25 fits in the through hole. The counterweights 29 are placed at the positions adjoining the eccentric members 25a, 25b with a phase difference of 180° therebetween in order to cancel an imbalanced inertia couple produced by rotation of the curve plates 26a, 26b.

The motion conversion mechanism is formed by the plurality of inner pins 31 as inner engagement members implanted in the flange portion 28a of the output shaft 28, and the through holes 30a provided in the curve plates 26a, 26b. The inner pins 31 are provided at regular intervals along a circumferential track about the rotation axis of the output shaft 28, and extend parallel to the axis of the output shaft 28, and base ends of the inner pins 31 are fixed to the output shaft 28. A needle roller bearing 31a formed by a hollow cylindrical body and needle rollers is provided on the outer peripheries of the inner pins 31. This needle roller bearing 31a reduces frictional resistance with the curve plates 26a, 26b when the inner pins 31 contact the inner peripheral surfaces of the through holes 30a in the curve plates 26a, 26b.

A reinforcing member 31b that reinforces the inner pins 31 is coupled and fixed to the tip ends of the inner pins 31 by press fitting. The inner pin reinforcing member 31b includes an annular flange portion 31c that couples the tip ends of the plurality of inner pins 31 together, and a cylindrical portion 31d having a cylindrical shape so as to couple to an inner diameter portion of the flange portion 31c and to extend in the axial direction away from the inner pins 31. The inner-pin reinforcing member 31b that reinforces the plurality of inner pins 31 uniformly distributes the load applied from the curve plates 26a, 26b to one or more of the inner pins 31 to all the inner pins 31.

The inner pins 31 respectively extend through the through holes 30a provided in a radially intermediate region of each curve plate 26a, 26b which is located between the outer periphery of the curve plate 26a, 26b and the axis of the input shaft 25. The through holes 30a are respectively provided at positions corresponding to the plurality of inner pins 31. The inner-diameter dimension of the through hole 30a is made larger than the outer-diameter dimension of the inner pin 31 (which refers to the "maximum outer diameter including the needle roller bearing 31a"; the same applies to the following description) by a predetermined amount. Thus, the inner pins 31 extending through the through holes 30a provided in the curve plates 26a, 26b serve as inner engagement members that engage with the through holes 30a.

The cylindrical portion 31d drivingly couples a lubricant pump 51 placed on the axis. When the plurality of inner pins 31 rotate together with the output shaft 28, the cylindrical portion 31d moved by the inner pins 31 drives the lubricant pump 51. The lubricant pump 51 provided in the partition wall 22k is driven by the output of the motor portion A to circulate the lubricant inside the in-wheel motor drive device 21.

The wheel-hub bearing portion C includes the wheel hub 32 that is fixed and coupled to the output shaft 28, an outer race 22c that couples to an opening at the other end of the speed-reduction-portion casing 22b, and a wheel-hub bearing 33 that holds the wheel hub 32 so that the wheel hub 32 is rotatable with respect to the outer race 22. The wheel-hub bearing 33 is a multi-row angular contact ball bearing, and an inner race of the wheel-hub bearing 33 is fitted on and fixed to the outer peripheral surface of the wheel hub 32. An outer raceway of the wheel-hub bearing 33 is formed on the inner peripheral surface of the outer race 22c. The wheel hub 32 has a cylindrical hollow portion 32a coupling to the shaft portion 28b of the output shaft 28, and a flange portion 32b formed at an end of the wheel hub 32 which is located farther from the speed reduction portion B. The road wheel of the driving wheel, not shown, is fixed and coupled to the flange portion 32b by a bolt 32c.

The operational principles of the in-wheel motor drive device 21 having the above configuration will be described in detail below.

The motor portion A receives, e.g., an electromagnetic force generated when an alternating current is supplied to a coil of the stator 23, and rotates the rotor 24 formed by a permanent magnet or a magnetic material.

Thus, the motor rotation shaft 35 connected to the rotor 24 outputs the rotation, and the motor rotation shaft 35 and the input shaft 25 rotate, whereby the curve plates 26a, 26b make revolution motion about the rotation axis of the input shaft 25. At this time, the outer pins 27 engage with the curved waves of the curve plates 26a, 26b so as to be in rolling contact with the curved waves. This causes the curve plates 26a, 26b to make rotation motion in the opposite direction from the rotation direction of the input shaft 25.

The inner pins 31 inserted through the through holes 30a have an outer diameter sufficiently smaller than the inner diameter of the through holes 30a, and respectively contact the wall surfaces of the through holes 30a according to the rotation motion of the curve plates 26a, 26b. Thus, the revolution motion of the curve plates 26a, 26b is not transmitted to the inner pins 31, and only the rotation motion of the curve plates 26a, 26a is transmitted to the wheel-hub bearing portion C via the output shaft 28. In this manner, the through holes 30a and the inner pins 31 serve as the motion conversion mechanism.

The output shaft 28 placed coaxially with the input shaft 25 outputs the rotation motion of the curve plates 26a, 26b as the output of the speed reduction portion B via the motion conversion mechanism. As a result, the rotation of the input shaft 25 is transmitted to the output shaft 28 after being reduced in speed by the speed reduction portion B. Thus, required torque can be transmitted to the driving wheel even if a low-torque, high-rotation motor portion A is employed.

The reduction ratio of the speed reduction portion B having the above configuration is calculated by "$(Z_A - Z_B)/Z_B$," where "$Z_A$" represents the number of outer pins 27, and "$Z_B$" represents the number of waves in the curve plate 26a, 26b. In the embodiment shown in FIG. 2, since $Z_A = 12$ and $Z_B = 11$, the reduction ratio is 1/11. Thus, a very high reduction ratio can be obtained.

As described above, the compact, high reduction-ratio in-wheel motor drive device 21 can be obtained by using as the speed reduction portion B a cycloidal speed reduction mechanism capable of achieving a high reduction ratio without having a multistage configuration.

The lubricant circulation passage of the embodiment of the present invention will be described below.

The lubricant pump 51 described above is provided in the partition wall 22k as a boundary between the motor portion A and the speed reduction portion B. The lubricant pump 51 is driven by the reinforcing member 31b. A suction oil passage 52 provided in the partition wall 22k provides communication between a suction port of the lubricant pump 51 and an oil pan 53 provided in the lower portion of the speed reduction portion B. A discharge oil passage 54 provided in the partition wall 22k has its one end connected to a discharge port of the lubricant pump 51 and the other end connected to one end of the motor-casing oil passage 55 provided in the motor casing 22a.

The motor-casing oil passage 55 is formed inside the motor casing 22a as a hollow cylindrical wall. The motor-casing oil passage 55 is provided in the upper portion of the motor casing 22a so as to extend in the axial direction. While an electric car is traveling, the outer peripheral surface of the motor casing 22a is exposed to outside air, whereby the lubricant flowing in the motor-casing oil passage 55 as a cooling oil passage is cooled. The other end of the motor-casing oil passage 55 connects to the end on the outer-diameter side of the motor-rear-cover oil passage 56. The motor-rear-cover oil passage 56 is formed inside the disc-shaped motor rear cover 22d that covers and seals one of openings at both axial ends of the motor casing 22a, namely the opening at one end of the motor casing 22a which is located on the opposite side from the speed reduction portion B. The motor-rear-cover oil passage 56, which is provided in a region between the outer edge and the center of the motor rear cover 22d, extends in the radial direction of the motor rear cover 22d. The end on the inner-diameter side of the motor-rear-cover oil passage 56 connects to one end of a motor-rotation-shaft oil passage 57 provided in the motor rotation shaft 35.

The motor-rotation-shaft oil passage 57 is provided inside the motor rotation shaft 35 so as to extend along the axis. One of both ends of the motor-rotation-shaft oil passage 57, which is located farther from the speed reduction portion B, connects to the end on the inner-diameter side of the motor-rear-cover oil passage 56 described above. The other end of the motor-rotation-shaft oil passage 57, which is located closer to the speed reduction portion B, connects to one end of a speed-reduction-portion input-shaft oil passage 58 that is provided in the input shaft 25 so as to extend along the axis. The central portion of the motor-rotation-shaft oil passage 57 connects to the end on the inner-diameter side of a rotor oil passage 59.

The speed-reduction-portion input-shaft oil passage 58 is provided inside the input shaft 25 so as to extend along the axis, and extends through the input shaft 25 to the other end thereof which faces the flange portion 28a. The speed-reduction-portion input-shaft oil passage 58 diverges into a lubricant oil passage 58a extending radially outward in the eccentric member 25a, and a lubricant oil passage 58b extending radially outward in the eccentric member 25b. The radially outer ends of the lubricant oil passages 58a, 58b communicate with the inner raceway 42a of the rolling bearing 41.

The rotor oil passage 59 is an oil passage diverging from the motor-rotation-shaft oil passage 57. The rotor oil passage 59 is provided inside the rotor support body 24b, and extends to the rotor main body 24a.

The lubricant pump 51 that is driven by the output shaft 28 via the reinforcing member 31b sucks the lubricant stored in the oil pan 53 through the suction oil passage 52, and discharges the lubricant to the discharge oil passage 54. While the electric car is traveling, the outer surface of the motor casing 22a is exposed to outside air. Thus, the lubricant flowing from the discharge oil passage 54 to the motor-rear-cover oil passage 56 through the motor-casing oil passage 55 is cooled as the lubricant sequentially flows through the motor-casing oil passage 55 as a cooling oil passage and the motor-rear-cover oil passage 56 as a cooling oil passage.

Then, the lubricant sequentially flows through the motor-rotation-shaft oil passage 57 and the speed-reduction-portion input-shaft oil passage 58, and flows into the lubricant oil passages 58a, 58b, thereby lubricating the rolling bearing 41 provided on the eccentric member 25a and the rolling bearing 41 provided on the eccentric member 25b. The lubricant further flows in the outer-diameter direction by the action of the centrifugal force, thereby sequentially lubricating the curve plates 26a, 26b, the inner pins 31, and the outer pins 27. Since the lubricant is thus supplied from the central axis, the lubricant lubricates the inside of the speed reduction portion B in a preferable manner. Then, the lubricant drains back into the oil pan 53 provided in the lower portion of the speed reduction portion B. Thus, the lubricant circulates and flows in the motor portion A and the speed reduction portion B.

According to the in-wheel motor drive device 21 of the embodiment of the present invention, the plurality of fins 22f are formed in the outer surface of the motor rear cover 22d. This enhances the heat dissipation effect of the motor rear cover 22d, and the motor rear cover 22d can be cooled by air cooling by using outside air on the outer surface of the motor rear cover 22d. Thus, the lubricant cooled when flowing in the motor-rear-cover oil passage 56 as a cooling oil passage can effectively suppress an increase in temperature of the motor portion A and the speed reduction portion B. As a result, the in-wheel motor drive device 21 can be effectively cooled by air cooling.

The fins 22f may be provided in a region of the outer surface of the motor rear cover 22d, which is located away from the region where the motor-rear-cover oil passage 56 is provided. However, the lubricant flowing in the motor-rear-cover oil passage 56 can be effectively cooled by providing the fins 22f in the region where the motor-rear-cover oil passage 56.

According to the embodiment of the present invention, the lubricant flowing in the motor-casing oil passage 55 can be cooled by air cooling by using outside air on the outer peripheral surface of the motor casing 22a. In particular, since the circumferential fins 22g enhances the heat dissipation effect of the motor casing 22a, the lubricant efficiently cooled when flowing in the motor-casing oil passage 55 can effectively suppress an increase in temperature of the motor portion A and the speed reduction portion B. Accordingly, the in-wheel motor drive device 21 can be effectively cooled by air cooling.

The stator 23 is relatively easily cooled because it adjoins the motor casing 22a. However, since the motor 24 is located away from the motor casing 22a, the motor 24 is less likely to receive the cooling effect by air cooling if no measures are taken. Accordingly, in the present embodiment, part of the efficiently cooled lubricant is caused to flow from the motor-rotation-axis oil passage 57 into the rotor oil passage 59. This can suppress an increase in temperature of the motor 24 as well. According to the present embodiment, the effect of cooling the rotor 24 located far inside the motor casing 22a can be enhanced even if the in-wheel motor drive device 21 is of an air-cooled type. As a result, the entire motor portion A can be cooled.

Figure 6:
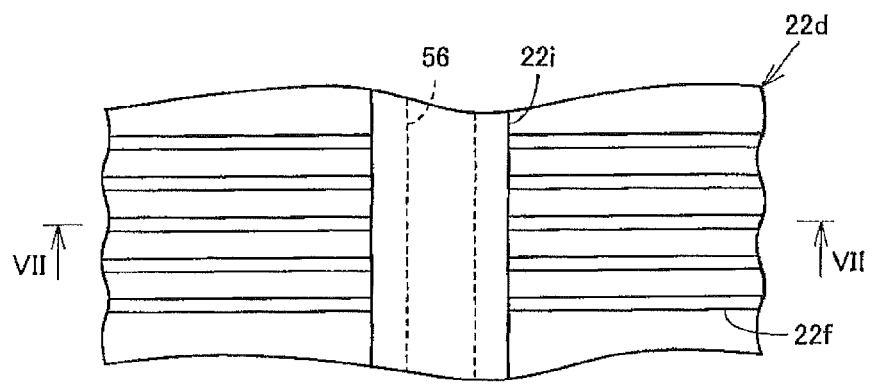
FIG. 6 is a partial enlarged rear view of a motor rear cover according to the embodiment of the present invention.
Figure 7:
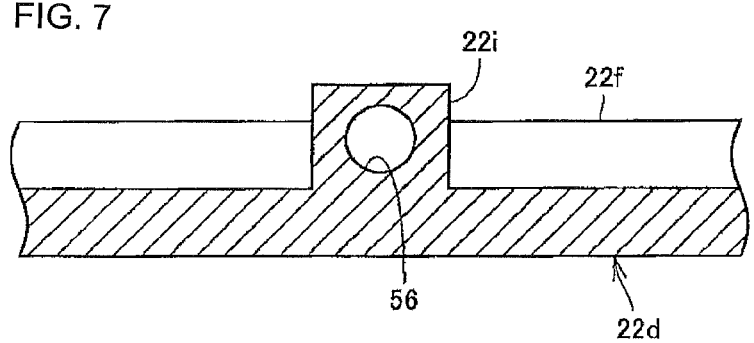
FIG. 7 is a sectional view taken along line VII-VII in FIG. 6.

FIG. 6 is a partial enlarged rear view of the motor rear cover according to the embodiment of the present invention. FIG. 7 is a sectional view taken along line VII-VII in FIG. 6. A motor-rear-cover ridge 22i extending so as to cross the cooling fins 22f are formed on the outer surface of the motor rear cover 22d, and the motor-rear-cover oil passage 56 is provided inside the motor-rear-cover ridge 22i. The motor-rear-cover ridge 22i and the cooling fins 22f are integrally connected to the motor rear cover 22d. The motor-rear-cover ridge 22i and the cooling fins 22f are comprised of the same light metal material, such as aluminum, as the motor rear cover 22d as a base material, and these elements 22i, 22f, and 22d are formed by casting.

In the present embodiment, the single motor-rear-cover ridge 22i is formed on the outer surface of the motor rear cover 22d so as to extend in the vertical direction along a radius from the top to the center, and the cross-sectional shape of the motor-rear-cover ridge 22i is made larger than the diameter of the motor-rear-cover oil passage 56 so that the motor-rear-cover oil passage 56 is provided inside the single motor-rear-cover ridge 22i. According to this embodiment, a large part of the periphery of the motor-rear-cover oil passage 56 is exposed to outside air, whereby the lubricant flowing in the motor-rear-cover oil passage 56 can further be cooled.

The motor-rear-cover ridge 22i including the motor-rear-cover oil passage 56 extends in the radial direction from the outer edge of the motor rear cover 22d to the central portion thereof. The plurality of cooling fins 22f formed at regular intervals on the outer surface of the motor rear cover 22d extend perpendicularly to the motor-rear-cover ridge 22i.

As shown in FIGS. 6 and 7, since the cooling fins 22f extend from the motor-rear-cover ridge 22i, heat of the lubricant flowing in the motor-rear-cover oil passage 56 is quickly dissipated via the motor-rear-cover ridge 22i and the cooling fins 22f. Thus, the lubricant flowing in the motor-rear-cover oil passage 56 in the motor-rear-cover ridge 22i can be more efficiently cooled.

Figure 10:
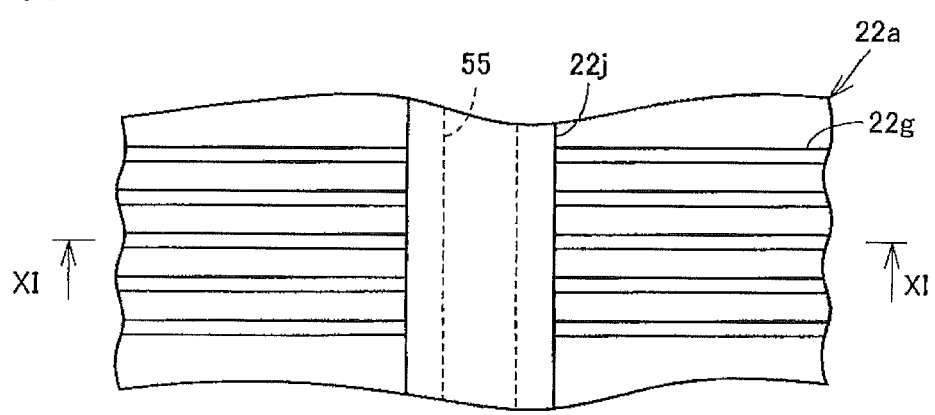
FIG. 10 is a partial enlarged plan view of a motor casing according to the embodiment of the present invention.
Figure 11:
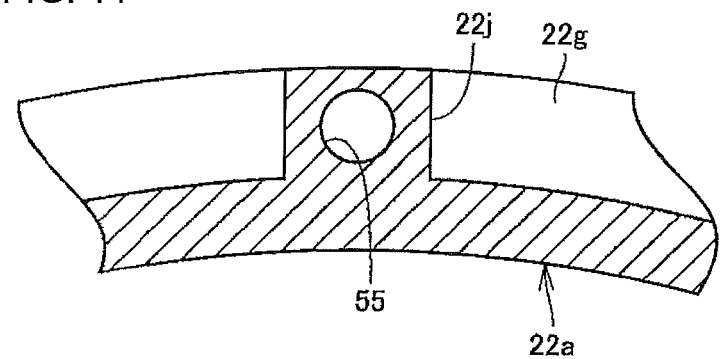
FIG. 11 is a sectional view taken along line XI-XI in FIG. 10.

FIG. 10 is a partial enlarged plan view of the motor casing according to the embodiment of the present invention. FIG. 11 is a sectional view taken along line XI-XI in FIG. 10. In this embodiment, the single motor-casing ridge 22j extending in the axial direction of the motor portion A is formed on the outer peripheral surface of the motor casing 22a, and the plurality of circumferential fins 22g extending in the circumferential direction so as to cross the motor casing ridge 22j are also formed on the outer peripheral surface of the motor casing 22a. The motor-casing ridge 22j and the circumferential fins 22g are integrally connected to the motor casing 22a. The motor-casing ridge 22j and the circumferential fins 22g are comprised of the same light metal material, such as aluminum, as the motor casing 22a as a base material, and these elements 22j, 22g, and 22a are formed by casting. The lateral dimension of the motor-casing ridge 22j is larger than that of the circumferential fins 22g, and is larger than the inner diameter of the motor-casing oil passage 55. The motor-casing oil passage 55 is provided inside the motor-casing ridge 22j.

According to the embodiment shown in FIGS. 10 and 11, since the motor-casing oil passage 55 is provided inside the motor-casing ridge 22j, the periphery of the motor-casing oil passage 55 is further exposed to outside air, whereby the lubricant flowing in the motor-casing oil passage 55 can be more efficiently cooled.

As shown in FIGS. 10 and 11, since the circumferential fins 22g as cooling fins extend from the motor-casing ridge 22j, heat of the lubricant flowing in the motor-casing oil passage 55 is quickly dissipated via the motor-casing ridge 22j and the circumferential fins 22g. Thus, the lubricant flowing in the motor-casing oil passage 55 in the motor-casing ridge 22j can be more efficiently cooled.

Figure 4:
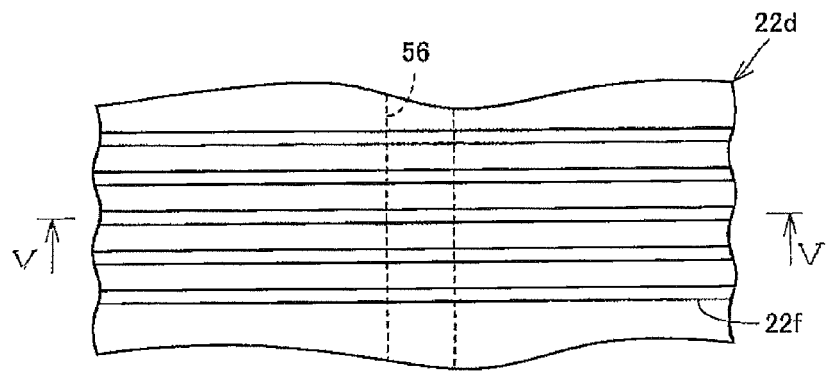
FIG. 4 is a partial enlarged rear view of a motor rear cover according to a modification of the present invention.
Figure 5:
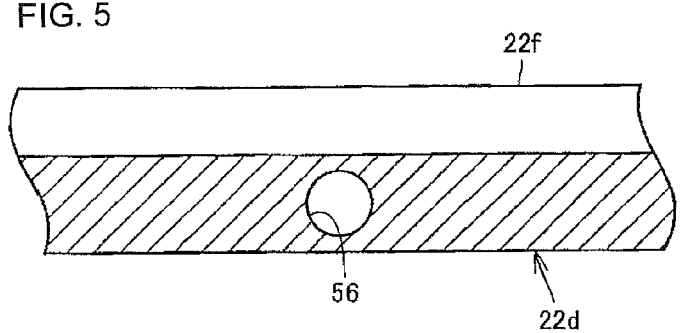
FIG. 5 is a sectional view taken along line V-V in FIG. 4.

A modification of the present invention will be described below. FIG. 4 is a partial enlarged rear view of a motor rear cover according to a modification, showing an example in which no ridge 22i is provided. Since the configuration is otherwise similar to that of the above embodiment, description thereof will be omitted. As shown in FIG. 4, the motor-rear-cover oil passage 56 extends in the vertical direction along the radial direction from the outer edge of the motor rear cover 22d to the central portion thereof, and the horizontally extending fins 22f extend in the direction crossing the motor-rear-cover oil passage 56. FIG. 5 is a sectional view of the motor rear cover taken along line V-V in FIG. 4, showing the state as viewed in the direction shown by arrows in FIG. 4. The fin 22f shown in FIG. 5 is a ridge protruding outward from the outer surface of the motor rear cover 22d, and the motor-rear-cover oil passage 56 is provided inside the motor rear cover 22d. Thus, the fin 22f is located at a different position from the motor-rear-cover oil passage 56 in the thickness direction of the motor rear cover 22d.

As shown in FIG. 3, the fins 22f extend at right angles to the motor-rear-cover oil passage 56. The fins 22f are ridges protruding outward from the outer surface of the motor rear cover 22d, and the motor-rear-cover oil passage 56 is provided inside the motor rear cover 22d. Thus, the fins 22f are located at a different position from the motor-rear-cover oil passage 56 in the thickness direction of the motor rear cover 22d.

According to the modification shown in FIGS. 4 and 5, the plurality of fins 22f are formed on the motor rear cover 22d. This enhances the heat dissipation effect of the motor rear cover 22d, and the motor rear cover 22d can be cooled by air cooling by using outside air on the outer surface of the motor rear cover 22d. Thus, the lubricant cooled when flowing in the motor-rear-cover oil passage 56 can effectively suppress an increase in temperature of the motor portion A and the speed reduction portion B. As a result, the in-wheel motor drive device 21 can be effectively cooled by air cooling.

Since the fins 22f extend in the horizontal direction, wind flows along the fins 22f when the electric car travels. This can prevent turbulence, and thus can reduce wind resistance.

Figure 8:
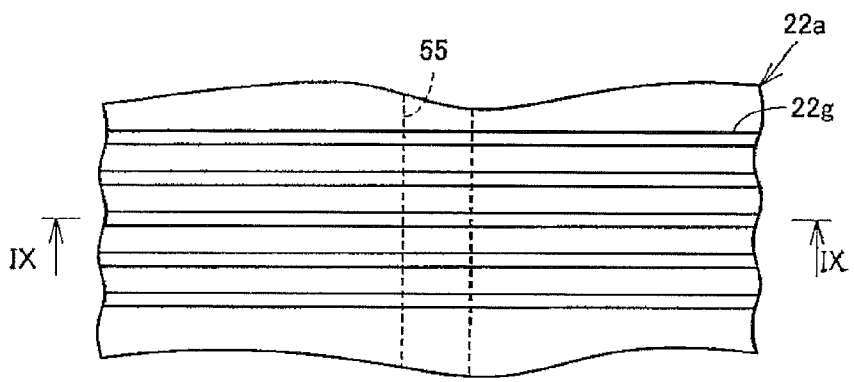
FIG. 8 is a partial enlarged plan view of a motor casing according to a modification of the present invention.
Figure 9:
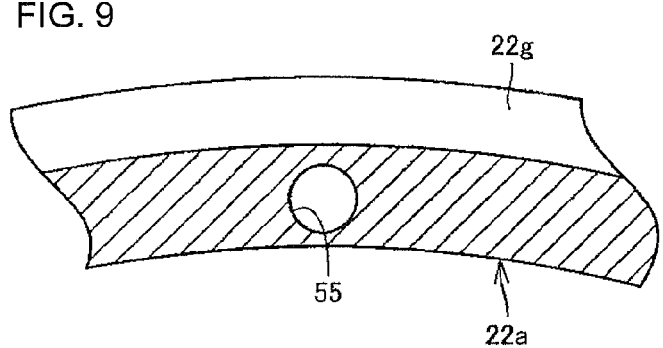
FIG. 9 is a sectional view taken along line IX-IX in FIG. 8.

A modification of the present invention will be described below. FIG. 8 is a partial enlarged plan view of a motor casing according to a modification of the present invention. FIG. 9 is a sectional view taken along line IX-IX in FIG. 8. Since the configuration is otherwise similar to that of the above embodiment, description thereof will be omitted. Unlike the above embodiment, in this modification, the circumferential fins 22g shown in FIG. 1 are provided so as to extend along the entire circumference of the motor casing 22a, so that the circumferential fins 22g are also provided near the motor-casing oil passage 55 extending in the upper portion of the motor casing 22a. As shown in FIG. 8, the motor-casing oil passage 55 extends in the axial direction, and the circumferential fins 22g extending in the circumferential direction extend in the direction crossing the motor-casing oil passage 55. The circumferential fins 22g are ridges protruding outward from the outer surface of the motor hosing 22a, and the motor-housing oil passage 55 is provided inside the motor housing 22a. Thus, the circumferential fins 22g are located at a different position from the motor-housing oil passage 55 in the thickness direction of the motor housing 22a.

According to the modification shown in FIGS. 8 and 9, the plurality of circumferential fins 22g are formed on the motor casing 22a. This enhances the heat dissipation effect of the motor casing 22a, and the motor casing 22a can be cooled by air cooling by using outside air on the outer surface of the motor casing 22a. Thus, the lubricant cooled when flowing in the motor-casing oil passage 55 can effectively suppress an increase in temperature of the motor portion A and the speed reduction portion B. As a result, the in-wheel motor drive device 21 can be effectively cooled by air cooling.

According to the modification shown in FIGS. 8 and 9, since the circumferential fins 22g are formed near the motor-casing oil passage 55, the lubricant flowing in the motor-casing oil passage 55 can be effectively cooled.

Although not shown in the figures, a plurality of axial fins extending in the axial direction of the motor portion A may be provided on the outer peripheral surface of the motor casing 22a. Like the circumferential fins 22g described above, such axial fins can cool the lubricant flowing in the motor-casing oil passage 55.

Although the embodiment of the present invention is described above with reference to the drawings, the present invention is not limited to the illustrated embodiment. Various modifications and variations can be made to the illustrated embodiment within a scope that is the same as, or equivalent to that of the present invention. For example, in the present invention, the speed reduction portion is not limited to the cycloidal speed reduction mechanism, and may be other speed reduction mechanisms in which a plurality of spur gears are combined.

INDUSTRIAL APPLICABILITY

The in-wheel motor drive device according to the present invention is advantageously used in electric cars and hybrid vehicles.

REFERENCE SIGNS LIST 21 in-wheel motor drive device
22a motor casing
22b speed-reduction-portion casing
22c outer race
22d motor rear cover
22f cooling fin
22g circumferential fin
22h outer peripheral fin
22i motor-rear-cover ridge
22j motor-casing ridge
22k partition wall
23 stator
24 rotor
25 input shaft
25a, 25b eccentric member
26a, 26b curve plate
27 outer pin
28 output shaft
30a, 30b through hole
31 inner pin
31b inner-pin reinforcing member
32 wheel hub
35 motor rotation shaft
41 rolling bearing
45 outer-pin holding portion
51 lubricant pump
52 suction oil passage
53 oil pan
54 discharge oil passage
55 motor-casing oil passage
56 motor-rear-cover oil passage
57 motor-rotation-shaft oil passage 58 speed-reduction-portion input-shaft oil passage
58a, 58b lubricant oil passage
59 rotor oil passage

The invention claimed is:
1. An in-wheel motor drive device, comprising:
a motor portion having a cylindrical motor casing, a motor rear cover that covers an opening located on one side in an axial direction of said motor casing, a plurality of cooling fins that are formed on at least one of an outer peripheral surface of said motor casing and an outer surface of said motor rear cover, and a motor rotation shaft that is provided in said motor casing to output rotation to the other side in said axial direction of said motor casing;
a speed reduction portion which has a cylindrical speed-reduction-portion casing having its one side in said axial direction connected to the other side in said axial direction of said motor casing, an input shaft provided in said speed-reduction-portion casing and coupled to said motor rotation shaft, and an output shaft, and which reduces a speed of rotation of said input shaft to transmit said rotation having the reduced speed to said output shaft;
a wheel hub that is rotatably supported in an opening located on the other side of said speed-reduction-portion casing, and is fixed and coupled to said output shaft;
a lubricant oil passage, which includes a lubricant pump, a discharge oil passage, a motor-casing oil passage, and a motor-rear-cover oil passage,
the motor-rear-cover oil passage provided in said motor rear cover;
a motor-casing ridge formed on said outer peripheral surface of said motor casing, extending radially outwardly from said outer peripheral surface, and having a thickness, said motor-casing ridge further extending in said axial direction of said motor casing,
a motor-casing oil passage provided in said thickness of said motor casing ridge, and cooling fins formed in a region of said outer peripheral surface of said motor casing where said motor-casing oil passage is provided, the cooling fins extending from said motor casing ridge and extending in a circumferential direction of said motor casing,
one end of the motor casing oil passage is connected to the discharge oil passage extending from a discharge port of the lubricant pump, the other end of the motor-casing oil passage is connected to the motor-rear-cover oil passage,
the lubricant oil circulating through the lubricant pump, the discharge oil passage, the motor-casing oil passage, the motor-rear-cover oil passage, and the speed reduction portion sequentially, so as to cool the speed reduction portion.

2. The in-wheel motor drive device according to claim 1, wherein
said cooling fins are formed in a region of said outer surface of said motor rear cover where said motor-rear-cover oil passage is provided.

3. The in-wheel motor drive device according to claim 2, wherein
a motor-rear-cover ridge is formed on said outer surface of said motor rear cover,
said motor-rear-cover oil passage is provided inside said motor-rear-cover ridge, and
said cooling fins extend from said motor-rear-cover ridge.

4. The in-wheel motor drive device according to claim 2, wherein
said motor-rear-cover oil passage extends in a vertical direction, and
said cooling fins formed on the outer surface of said motor rear cover extend in a horizontal direction.

5. The in-wheel motor drive device according to claim 1, wherein
said cooling fins are comprised of a same material as said motor casing having said cooling fins provided thereon or said motor rear cover having said cooling fins provided thereon.

6. The in-wheel motor drive device according to claim 5, wherein
said cooling fins are formed by casting.

7. The in-wheel motor drive device according to claim 1, wherein
said lubricant pump is driven by said motor portion to discharge said lubricant, and said lubricant pump is provided inside said motor casing or inside said speed-reduction-portion casing.

8. The in-wheel motor drive device according to claim 1, wherein
said speed reduction portion is a cycloidal speed reducer having an eccentric member provided on said input shaft, a revolution member provided on said eccentric member, an outer-periphery engagement member that engages with an outer periphery of said revolution member to cause rotation motion of said revolution member, and a motion conversion mechanism that outputs and transmits said rotation motion of said revolution member to said output shaft.

* * * * *